(12) United States Patent
Lee

(10) Patent No.: US 8,376,383 B1
(45) Date of Patent: Feb. 19, 2013

(54) BICYCLE AND BASKET CONNECTING DEVICE FOR CONNECTING BASKET TO BICYCLE

(76) Inventor: Sheng-Kai Lee, Taichung (TW)

( * ) Notice: Subject to any disclaimer, the term of this patent is extended or adjusted under 35 U.S.C. 154(b) by 0 days.

(21) Appl. No.: 13/463,660

(22) Filed: May 3, 2012

(30) Foreign Application Priority Data

Mar. 6, 2012 (TW) .............................. 101107455 A

(51) Int. Cl.
*B62J 9/00* (2006.01)
(52) U.S. Cl. .................................................. 280/288.4
(58) Field of Classification Search ............... 280/288.4; 224/424, 421, 31–36; 248/230
See application file for complete search history.

(56) References Cited

U.S. PATENT DOCUMENTS

| | | | | |
|---|---|---|---|---|
| 2,168,916 A | * | 8/1939 | Pawsat ........................... | 224/434 |
| 2,583,550 A | * | 1/1952 | Lucian et al. .................. | 224/424 |
| 2,700,493 A | * | 1/1955 | Meier, Jr. ....................... | 224/431 |
| 3,603,549 A | * | 9/1971 | Brilando et al. .......... | 248/229.14 |
| 4,282,993 A | * | 8/1981 | Humlong ....................... | 224/431 |
| 4,730,758 A | * | 3/1988 | McMurtrey ................... | 224/417 |

* cited by examiner

*Primary Examiner* — Tashiana Adams

(57) ABSTRACT

The bicycle basket connecting device connects a basket to the threaded hole define in the lower end of the bicycle front fork and the two fork blades of the bicycle where two brake arms are connected. The bicycle basket connecting device is adjustable to meet different sizes of front forks.

8 Claims, 6 Drawing Sheets

BICYCLE AND BASKET CONNECTING DEVICE FOR CONNECTING BASKET TO BICYCLE

FIELD OF THE INVENTION

The present invention relates to a bicycle basket connecting device, and more particularly, to a bicycle basket connecting device for connecting the basket to the front of the bicycle.

BACKGROUND OF THE INVENTION

The conventional bicycle bracket connecting device is disclosed in Taiwan Utility Model No. M341636 and the bicycle bracket connecting device connects the basket to the front of the bicycle. The bicycle bracket connecting device includes hooks on the lower end thereof and loops on the top thereof so that the basket is hooked to the hooks and the handle of the basket is then engaged with the loops. The basket is detachably connected to the bicycle bracket connecting device.

However, the basket is designed to be connected to the handlebar of the bicycle, and there are other accessories such as head light to be connected to the handlebar so that the space for the accessories is not sufficient.

TW505129 and TW558535 provide alternative ways to connect the basket to the front fork. Nevertheless, the fixing member of TW558535 is secured to the head tube so that it may swing and not stable. The fixing member of TW505129 has to be cooperated to specific front fork with fixing unit, and cannot be installed to the bicycles without the specific front fork.

The present invention intends to provide a bicycle basket connecting device which allows the basket to be easily installed to and detached from the bicycle. The bicycle basket connecting device allows the basket to be installed to any type of bicycles.

SUMMARY OF THE INVENTION

The present invention relates to a bicycle basket connecting device for connecting a basket to a front fork. The front fork has a steerer tube and two fork blades which extend from the lower end of the steerer tube to form the fork-shaped front fork. A threaded hole is defined in the lower end of the steerer tube. A front wheel is located between the two fork blades and the axle of the front wheel is connected between the two fork blades. Each fork blade has a fixing portion and two brake arms are connected to the two fixing portions respectively.

The bicycle basket connecting device comprises a body, a connection link, two support rods and two adjustment units. The body is to be connected with the basket and has two support portions.

The connection link has a first portion and a second portion. The first portion is connected to the body and the second portion is detachably connected to the lower end of the steerer tube by way of threading.

The two support rods are respectively connected to the two support portions and extend downward. Two respective lower ends of the two support rods are detachably connected to the two fixing portions of the two fork blades by way of threading.

The two adjustment units respectively adjust the distance between the lower end of each of the two support rods and the support portion corresponding thereto. The bicycle basket connecting device is able to be connected to the existed threaded hole in the lower end of the front fork and the fixing portions of the fork blades, and the length of the support rods can be adjusted to meet different sizes of the front forks.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
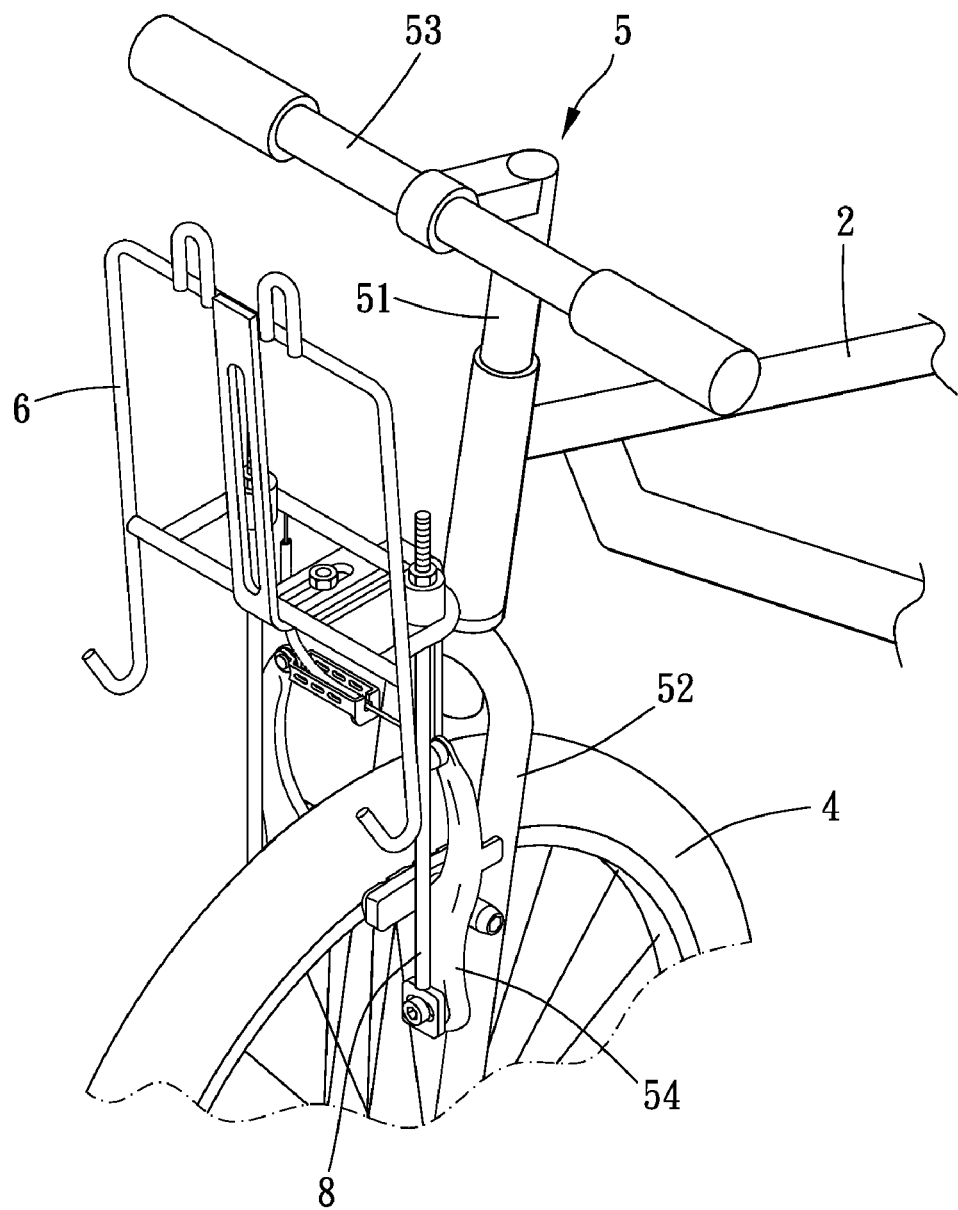
FIG. 1 is a perspective view to show the bicycle basket connecting device of the present invention.

Referring to FIGS. 1 to 5, the bicycle basket connecting device of the present invention is to connect a basket 1 to a bicycle which comprises a frame 2, a rear wheel 3, a front wheel 4 and a front fork 5. The rear wheel 3 is rotatably connected to the rear end of the frame 2. The front fork 5 has a steerer tube 51 and two fork blades 52 which extend from the lower end of the steerer tube 51 to form the fork-shaped front fork 5. The two fork blades 52 are substantially parallel to each other and a distance is defined between the two fork blades 52. The top of the steerer tube 51 is integrally connected with a handlebar 53 or the handlebar 53 is transversely connected to the top of the steerer tube 51. A threaded hole 511 is defined in the lower end of the steerer tube 51 and faces toward the front of the frame 2. The front wheel 4 is located between the two fork blades 52 and the axle of the front wheel 4 is connected between the two fork blades 52. Each fork blade 52 has a fixing portion 521 and two brake arms 54 are connected to the two fixing portions 521 respectively. Each of the fixing portions 521 has a threaded hole and a bolt 522 extends through the threaded hole and the brake arm 54 is connected to the bolt 522. Alternatively, the fixing portion s521 also be two protrusions which extend through the brake arms 54 directly. The bicycle may further equipped with a driving mechanism comprising pedals, a crank, a wheelgear and a chain. The bicycle can also be driven by a motor, or, the bicycle can also be moved by the user's feet kicking the ground.

Figure 3:
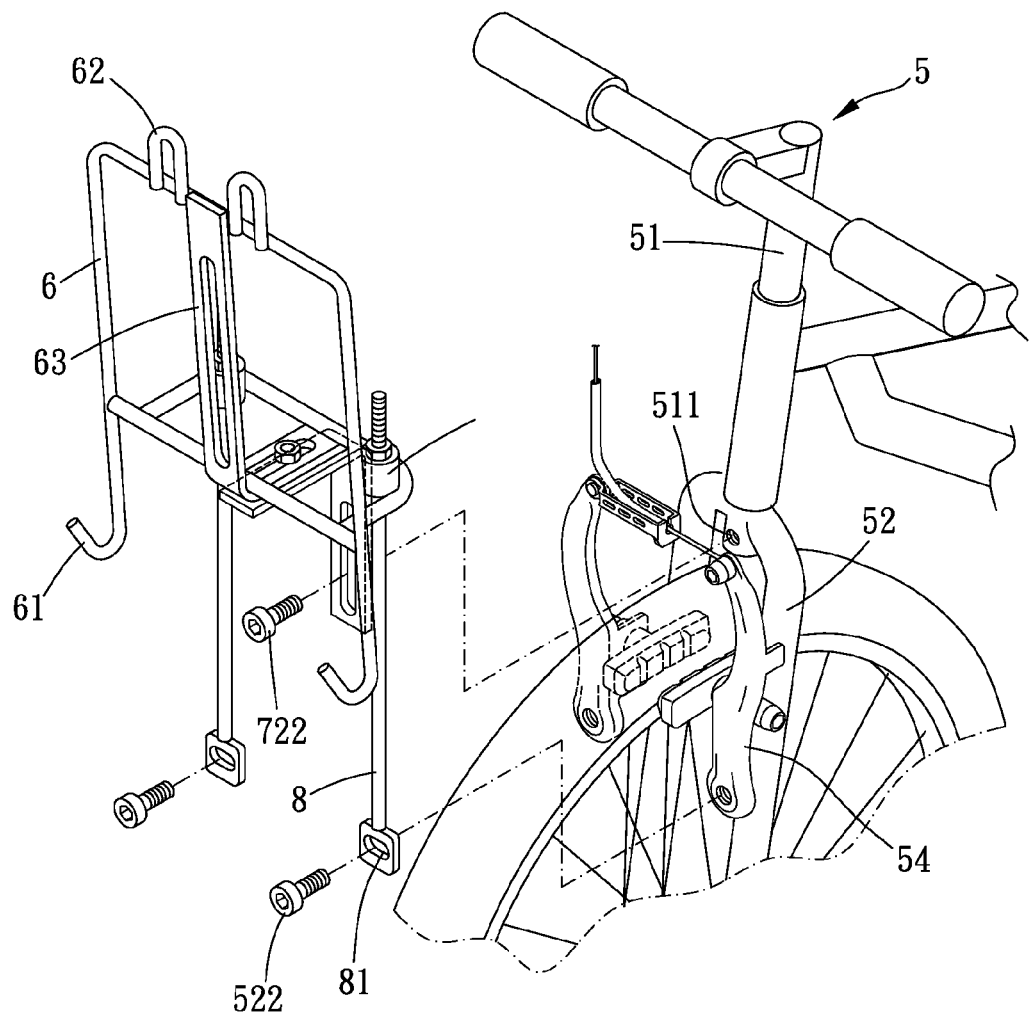
FIG. 3 is an exploded view to show that the bicycle basket connecting device of the present invention is to be connected to the bicycle.
Figure 4:
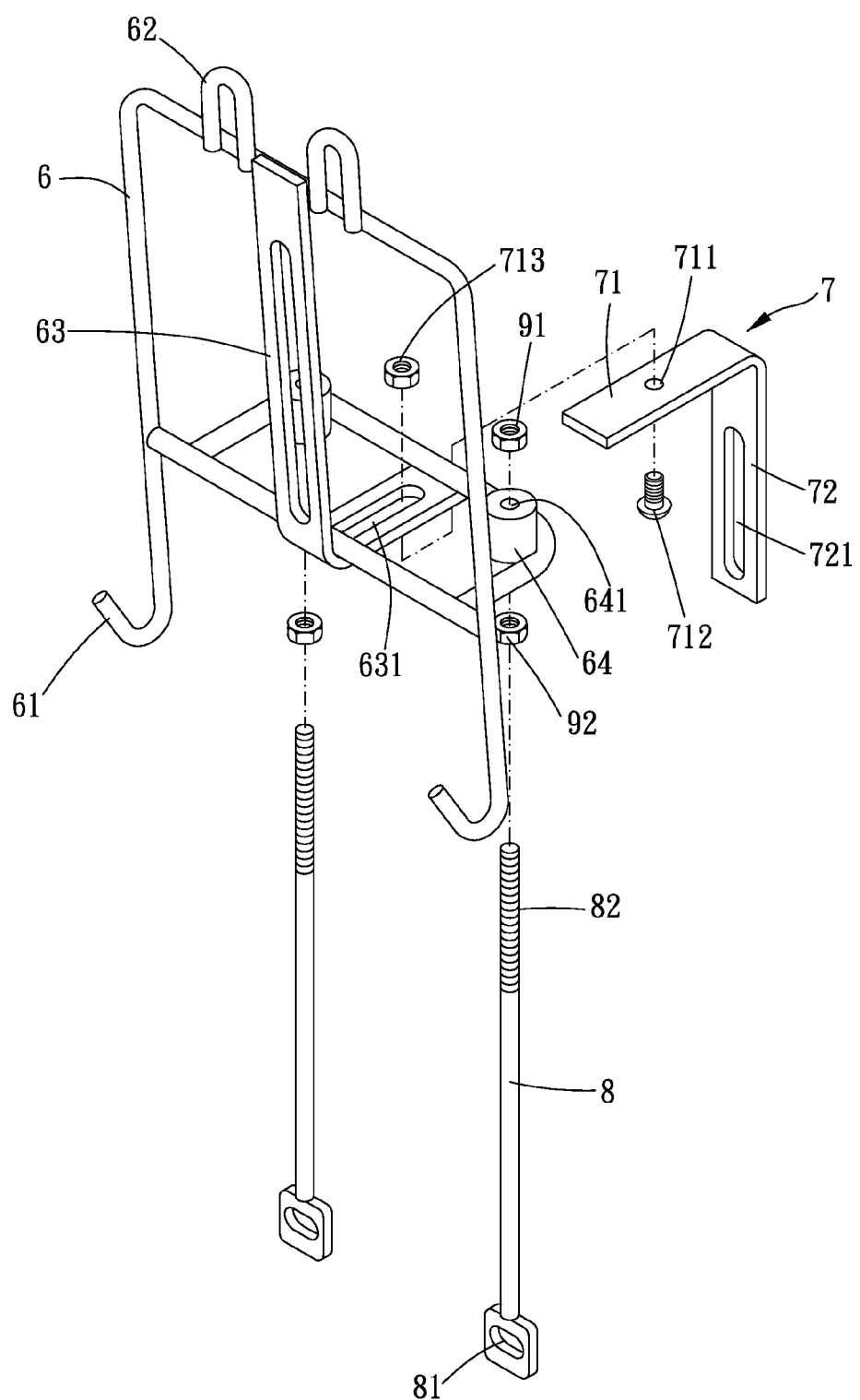
FIG. 4 is an exploded view to show the bicycle basket connecting device of the present invention.
Figure 5:
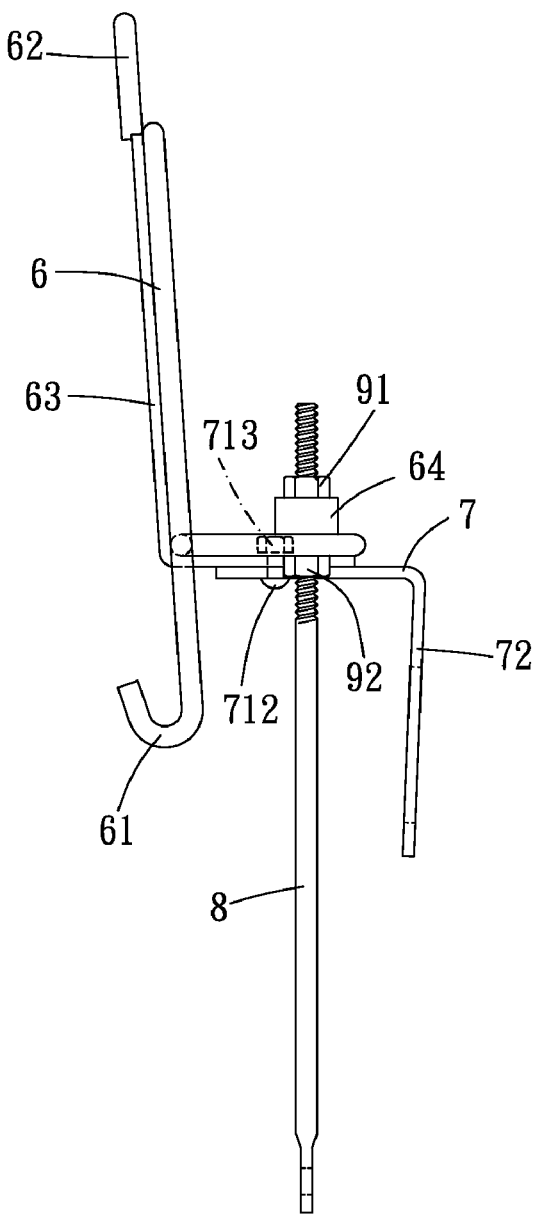
FIG. 5 is a side view to show the bicycle basket connecting device of the present invention.

Referring to FIGS. 3 to 5, the bicycle basket connecting device of the present invention comprises a body 6, a connection link 7, two support rods 8 and two adjustment units.

The body 6 is connected to the basket 1 and is made by bending metallic wires and includes two hooks 61 which are located on the lower end of the body 6 and arranged in the transverse direction. The two hooks 61 are curved upward. Two oval-shaped loops 62 are formed on the top and arranged in the transverse direction of the body 6, so that the basket 1 is hooked to the hooks 61 and the loops 62. The body 6 further has a board 63 connected to the bent metallic wires to increase the strength of the body 6. The bent metallic wires and the board 63 extend backward, and two support portions 64 are located in the transverse direction on the back of the body 6. In this embodiment, the support portions 64 are two blocks fixed to the bent metallic wires and each support portion 64 has a through hole 641.

The connection link 7 has a first portion 71 and a second portion 72, the first portion 71 is connected to the body 6 and the second portion 72 is detachably connected to the lower end of the steerer tube 51 by way of threading. The connection link 7 is an L-shaped link, and the first and second portions 71, 72 are two boards. A hole 711 is defined in the first portion 71 and an elongate hole 631 is defined in the portion that extends backward from the boards 63. By using a bolt 712 and a nut 713, the first portion 71 is fixed to the elongate hole 631 so that the first portion 71 is adjustable back and forth. Alternatively, the elongate hole can be defined in the first portion 71 so that the first portion 71 can be adjusted. An elongate hole 721 is defined in the second portion 72 and a bolt 722 extends through the elongate hole 721 and is threadedly connected to the threaded hole 511 at the lower end of the steerer tube 51, such that the position that the connection link 7 is connected to the steerer tube 51 can be adjusted.

The two support rods 8 are connected to the through holes 641 of the two support portions 64. The two support rods 8 are separated from each other in the transverse direction and each support rod 8 has a fixing hole 81 defined in the lower end thereof. The fixing holes 81 are non-circular holes in the transverse direction. A bolt 522 extends through the fixing hole 81 and is connected to the fixing portion 521 so that the supports 8 are fixed to the fork blades 52. Each support rod 8 has a threaded section 82 which extends downward from the top of each support rod 8.

The two adjustment units are able to respectively adjust the distance between the lower end of each of the two support rods 8 and the support portion 64 corresponding thereto. Each of the adjustment units has two locking members 91, 92 which are threadedly connected to the threaded sections 82 of the support rods 8. Each of the support portions 64 is clamped between the locking members 91, 92 corresponding thereto. Alternatively, the adjustment units can also be the arrangement that the top end of the support rod 8 is fixed to the support portion 64 so that the users can adjust the length of the support rods 8. For example, the support rods each are composed of two sections, one section has a hole and the other section has multiple holes in the longitudinal direction thereof. A pin or a bolt extends through the holes in the two sections to allow the users to adjust the length of the support rods, the distance between the lower end of each of the two support rods and the support portion 64 corresponding thereto.

Figure 2:
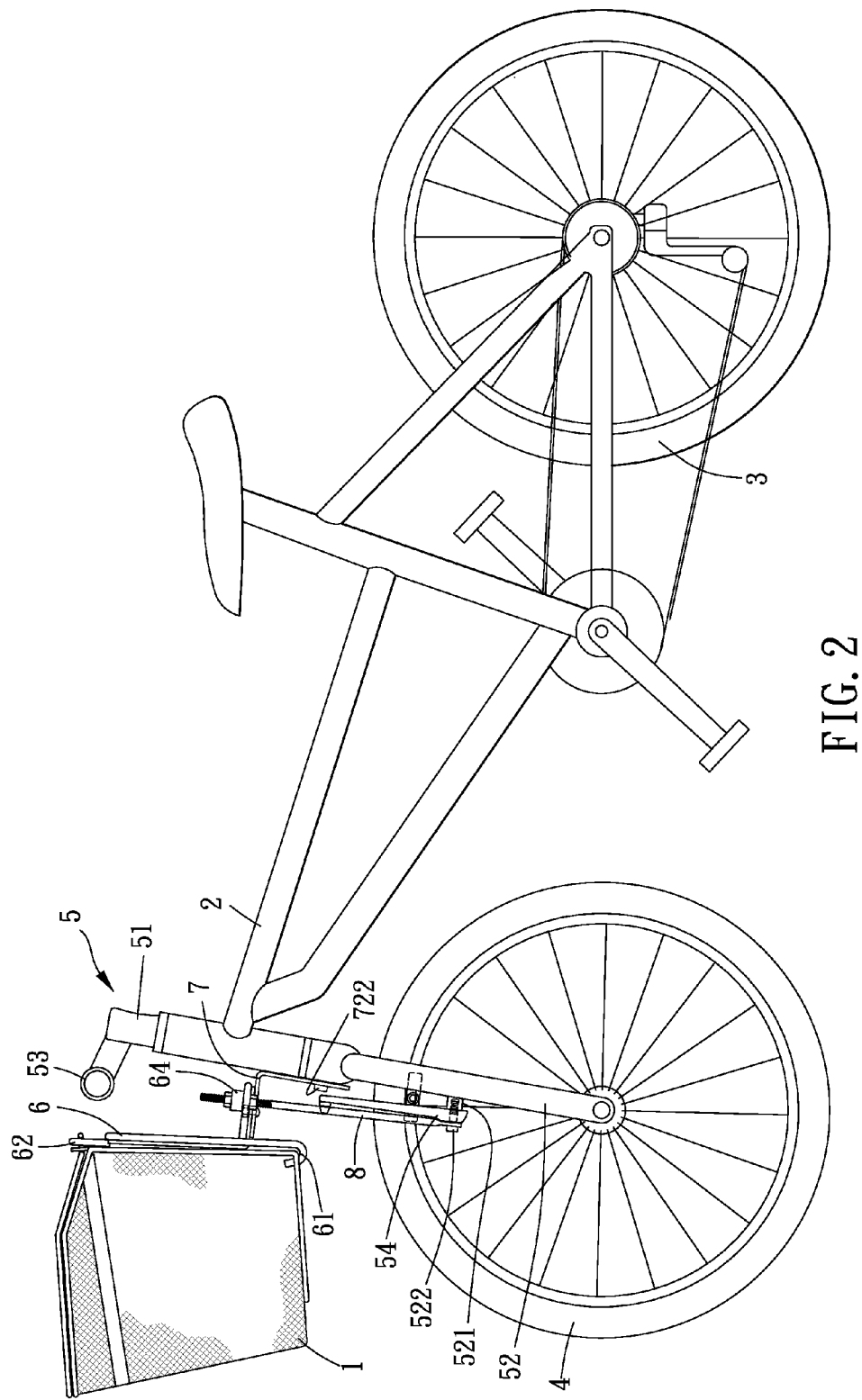
FIG. 2 is a side view to show that the basket is connected to the bicycle by the bicycle basket connecting device of the present invention.

As shown in FIGS. 2 and 3, the bicycle basket connecting device of the present invention can be connect to the threaded hole 511 at the lower end of the steerer tube 51 and the fixing portions 521 of the fork blades 52, and the basket 1 is connected to the bicycle basket connecting device of the present invention. The two adjustment units are able to respectively adjust the distance between the lower end of each of the two support rods 8 and the support portion 64 corresponding thereto, so that the present invention can be cooperated with different sizes of bicycle frames. Because the fixing holes 81 are made to be two oval-shaped holes in the transverse direction, the supports 8 can be connected to those front forks 5 with wider or narrow distance between the two fork blades 52.

Figure 6:
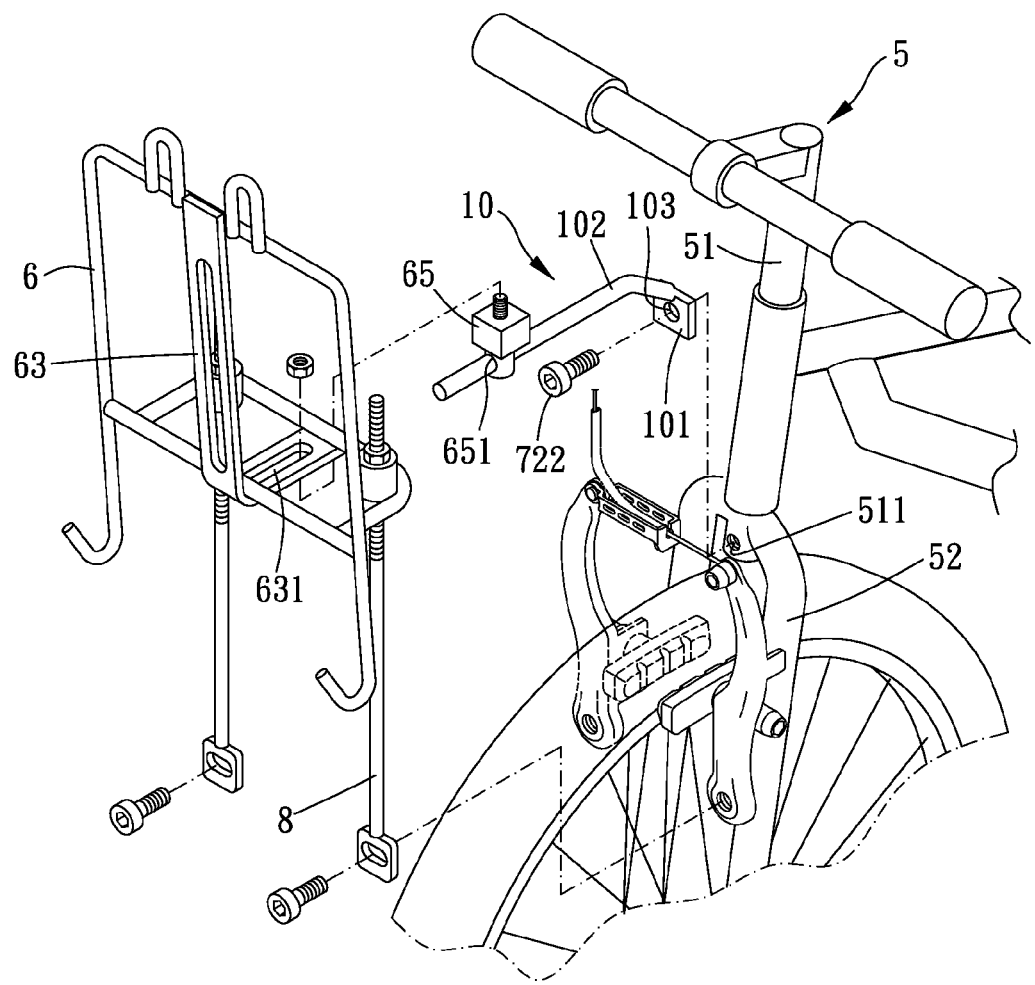
FIG. 6 is an exploded view to show the second embodiment of the bicycle basket connecting device of the present invention.

FIG. 6 shows the second embodiment of the present invention, wherein the body 6 has a slide 65 which is connected to the board 63 of the body 6 and movable within the elongate hole 631. The slide 65 has a passage 651. The connection link 10 has a fixing plate 101 and an adjustment rod 102. The fixing plate 101 has a hole 103 through which a bolt 722 extends, the bolt 722 is threadedly connected to the threaded hole 511 of the steerer tube 51. The adjustment rod 102 extends from the fixing plate 101 and passes between the two support rods 8. The adjustment rod 102 extends through the passage 651 and pivotable about an axis of the passage 651.

The user can rotate the slide 65 relative to the adjustment rod 102 and cooperate with the adjustment units to tilt the body 6 left or right to adjust the basket to tilt left or right.

While we have shown and described the embodiment in accordance with the present invention, it should be clear to those skilled in the art that further embodiments may be made without departing from the scope of the present invention.

What is claimed is:

1. A bicycle basket connecting device for connecting a basket to a front fork, the front fork having a steerer tube and two fork blades which extend from a lower end of the steerer tube to form the fork-shaped front fork, a threaded hole defined in the lower end of the steerer tube, a front wheel located between the two fork blades and an axle of the front wheel connected between the two fork blades, each fork blade having a fixing portion and two brake arms connected to the two fixing portions respectively, the bicycle basket connecting device comprising:
a body adapted to be connected with the basket, the body having two support portions;
a connection link having a first portion and a second portion, the first portion connected to the body and the second portion adapted and detachably connected to the lower end of the steerer tube by way of threading;
two support rods respectively connected to the two support portions and extending downward, two respective lower ends of the two support rods being detachably connected to the two fixing portions of the two fork blades by way of threading, and
two adjustment units respectively adjusting a distance between a lower end of each of the two support rods and the support portion corresponding thereto.

2. The device as claimed in claim 1, wherein the connection link is an L-shaped link, the first and second portions are two boards, an elongate hole is defined between the first and second portions.

3. The device as claimed in claim 1, wherein the connection link has a fixing plate and an adjustment rod, the fixing plate has a hole through which a bolt extends, the bolt is threadedly connected to the threaded hole of the steerer tube, the adjustment rod extends from the fixing plate and passes between the two support rods, the body has a slide which has a passage, the adjustment rod extends through the passage and pivotable about an axis of the passage.

4. The device as claimed in claim 3, wherein the slide is movable back and forth relative to the body.

5. The device as claimed in claim 1, wherein the two support rods are separated from each other in a transverse direction and each support rod has a fixing hole defined in a lower end thereof, a bolt extends through the fixing hole and is connected to the fixing portion, the fixing holes are non-circular holes in the transverse direction.

6. The device as claimed in claim 1, wherein each support portion has a through hole, the support rods extend through the through holes of the support portions, each support rod has a threaded section, each of the adjustment units has two locking members which are threadedly connected to the threaded sections of the support rods, each of the support portions is clamped between the locking members corresponding thereto.

7. A bicycle having the bicycle basket connecting device as claimed in claim 1, comprising:
- a frame, the front fork being disposed to the frame;
- a rear wheel rotatably connected to a rear end of the frame; and
- the second portion of the connection link detachably connected to the lower end of the steerer tube by way of threading, the two respective lower ends of the two support rods being detachably connected to the two fixing portions of the two fork blades by way of threading.

8. A bicycle having the bicycle basket connecting device as claimed in claim 6, comprising:
- a frame, the front fork being disposed to the frame;
- a rear wheel rotatably connected to a rear end of the frame; and
- the second portion of the connection link detachably connected to the lower end of the steerer tube by way of threading, the two respective lower ends of the two support rods being detachably connected to the two fixing portions of the two fork blades by way of threading.

* * * * *